(12) United States Patent
DeWeert et al.

(10) Patent No.: US 11,396,354 B2
(45) Date of Patent: Jul. 26, 2022

(54) COVERT UNDERWATER NAVIGATION VIA POLARIMETRY

(71) Applicant: BAE Systems Information and Electronic Systems Integration Inc., Nashua, NH (US)

(72) Inventors: Michael J. DeWeert, Kaneohe, HI (US); Reid A. Noguchi, Honolulu, HI (US)

(73) Assignee: BAE Systems Information and Electronic Systems Integration Inc., Nashua, NH (US)

(*) Notice: Subject to any disclaimer, the term of this patent is extended or adjusted under 35 U.S.C. 154(b) by 360 days.

(21) Appl. No.: 16/849,375

(22) Filed: Apr. 15, 2020

(65) Prior Publication Data

US 2021/0323644 A1 Oct. 21, 2021

(51) Int. Cl.
*B63G 8/00* (2006.01)
*B63G 8/38* (2006.01)
*G05D 1/00* (2006.01)
*G05D 1/02* (2020.01)
*G01J 4/04* (2006.01)

(52) U.S. Cl.
CPC ............... *B63G 8/001* (2013.01); *B63G 8/38* (2013.01); *G01J 4/04* (2013.01); *G05D 1/0027* (2013.01); *G05D 1/0206* (2013.01); *B63G 2008/004* (2013.01)

(58) Field of Classification Search
CPC .... B63G 8/001; B63G 8/38; B63G 2008/004; G05D 1/0027; G05D 1/0206; G01J 4/04
See application file for complete search history.

(56) References Cited

U.S. PATENT DOCUMENTS

| 9,464,938 | B2* | 10/2016 | Tillotson | ............... G01J 3/0224 |
| 2003/0043375 | A1* | 3/2003 | Opsal | ................ G01B 11/0641 |
| | | | | 356/369 |
| 2007/0051890 | A1* | 3/2007 | Pittman | ............. H04N 5/23206 |
| | | | | 348/E5.09 |
| 2021/0323644 | A1* | 10/2021 | DeWeert | ................ B63B 49/00 |
| 2022/0057519 | A1* | 2/2022 | Goldstein | ............... G01S 17/88 |

OTHER PUBLICATIONS

Cronin, et al. Polarization Vision and Its Role in Biological Signaling. Integr. Comp. Biol., 43:549-558 (2003).
Lerner, et al. Navigation by light polarization in clear and turbid waters. Philosophical Transactions of The Royal Society. Phil. Trans. R. Soc. B (2011) 366, 671-679. doi: 10.1098/rstb.2010.0189.
Powell, et al. Bioinspired Polarization Vision Enables Underwater Geolocalization. Sci.Adv. 2018;4:eaao6841.

* cited by examiner

*Primary Examiner* — S. Joseph Morano
*Assistant Examiner* — Jovon E Hayes
(74) *Attorney, Agent, or Firm* — Sand, Sebolt & Wernow LPA (57) ABSTRACT

Underwater navigational systems and methods utilizing sunlight polarized via scattering through the water column that does not require an underwater vehicle to surface or use a global position system to maintain precise navigational positions and headings. These navigational systems and methods may be employed by manned or unmanned underwater vehicles and may be utilized by individual units and by units operating in a swarm.

20 Claims, 3 Drawing Sheets

COVERT UNDERWATER NAVIGATION VIA POLARIMETRY

TECHNICAL FIELD

The present disclosure relates generally to underwater navigation techniques. More particularly, the present disclosure relates to long distance underwater navigation by vehicles utilizing polarized sunlight. Specifically, the present disclosure relates to methods of long distance navigation by autonomous vehicles utilizing polarized sunlight within the water column without the need for surfacing to provide navigational corrections.

BACKGROUND

Improvements in autonomous vehicle technology have allowed advancement of research and/or operations carried out in extreme or difficult to access environments. These environments may include small, remote and/or dangerous terrestrial, subterranean, aerial, space and/or aquatic environments including both in and on water situations. Advances in autonomous vehicle technology, particularly in underwater environments, have allowed better access to areas in turbid, visually obscured and/or navigationally challenging conditions.

Underwater navigation techniques used by current underwater vehicles, including autonomous underwater vehicles (AUVs), typically involve the use of inertial measurement units (IMUs) which may measure and report force, angular rate, orientation, or the like through the use of one or more accelerometers, gyroscopes, pressure transducers, magnetometers, or the like. When utilized in underwater environments and for underwater navigation, IMUs are prone to drift and errors due to sea currents and water movements and are often inadequate for precise navigation when used alone. Therefore, current underwater navigation systems typically require periodic surfacing to correct navigational errors introduced while the unit is operating while submerged below the surface of the water. These corrections tend to involve the use of global positioning system (GPS) receivers, compasses, and/or other similar components. Other surfaced-based navigational aids, including navigation based on the position of the unit relative to celestial bodies such as our sun or other stars, may also be employed to correct any errors introduced while navigating under water.

While current systems utilizing surfacing to correct navigational errors are effective, in certain applications and environments the act of surfacing can comprise the safety, security and/or mission effectiveness of an underwater vehicle.

Further, as technology continues to advance in the field of autonomous vehicles, swarms of AUVs may be deployed into an in-water environment with each unit within the swarm requiring navigational fixes. Accordingly, current systems when extrapolated out to a swarm of AUVs may require each individual member of the swarm to periodically surface to correct navigational errors and/or to update its current position. These multiple surfacing events may further compromise the safety, security, and/or mission effectiveness of such a swarm of underwater vehicles, while simultaneously introducing additional time constraints on the navigational parameters to allow for multiple surfacing events by the members of the swarm.

SUMMARY

The present disclosure addresses these and other issues by providing underwater navigational systems and methods utilizing sunlight polarized via scattering through the water column that does not require an underwater vehicle to surface to maintain precise navigational positions and headings.

In one aspect, an exemplary embodiment of the present disclosure may provide a system for covert underwater navigation comprising: at least one underwater platform operable to navigate to a desired destination; a clock carried by the underwater platform operable to maintain a precise time and date; at least one polarimetric sensor carried by the underwater platform operable to detect polarized light; and at least one processor carried by the at least one underwater platform and in operative communication with the clock and the at least one polarimetric sensor, the processor operable to determine the direction to the sun relative to the underwater platform and further operable to calculate the global position of the underwater platform via the time, date, and direction to the sun. This exemplary embodiment or another exemplary embodiment may further wherein the at least one underwater platform is further operable to make a course corrective action based on the global position calculated by the processor. This exemplary embodiment or another exemplary embodiment may further wherein the course corrective action is one of adjusting a heading, speed, and depth of the at least one underwater platform. This exemplary embodiment or another exemplary embodiment may further wherein the processor is further operable to determine the direction of the sun and calculate the global position of the at least one underwater platform, and the at least one underwater platform is further operable to perform the course corrective action, without the at least one underwater platform surfacing. This exemplary embodiment or another exemplary embodiment may further wherein the at least one underwater platform is an autonomous underwater vehicle. This exemplary embodiment or another exemplary embodiment may further a plurality of underwater platforms operable to navigate to the desired destination, each underwater platform carrying a clock, at least one polarimetric sensor, and at least one processor. This exemplary embodiment or another exemplary embodiment may further wherein the plurality of underwater platforms are further operable to determine their position relative to each of the other underwater platforms via the timing of communications signals between each of the plurality of underwater platforms.

In another aspect, an exemplary embodiment of the present disclosure may provide a method of underwater navigation comprising: deploying at least one underwater platform having a clock and at least one polarimetric sensor into a body of water; beginning navigation towards a desired destination; detecting polarized light via the at least one polarimetric sensor; determining the direction to the sun relative to the underwater platform; and calculating the global position of the underwater platform based on the date, time, and direction to the sun. This exemplary embodiment or another exemplary embodiment may further provide wherein determining the direction to the sun relative to the underwater platform further comprises: determining the degree of polarization of the detected polarized light; and comparing the degree of polarization of the detected polarized light across a field of view of the at least one polarimetric sensor to determine a polarization plane closest to 100 percent polarization as the plane perpendicular relative to the direction of the sun. This exemplary embodiment or another exemplary embodiment may further provide continuously detecting polarized light via the polarimetric sensor; continuously determining the direction to the sun relative to the underwater platform; and continuously calculating the global position of the underwater platform. This exemplary embodiment or another exemplary embodiment may further provide performing a course corrective action in response to calculating the global position of the underwater platform. This exemplary embodiment or another exemplary embodiment may further provide wherein the course corrective action is one of changing a heading, a speed, and a depth of the underwater platform. This exemplary embodiment or another exemplary embodiment may further provide wherein determining the direction of the sun, calculating the global position of the underwater platform, and performing the course corrective action at accomplished without the underwater platform surfacing. This exemplary embodiment or another exemplary embodiment may further provide wherein the underwater platform is an autonomous underwater vehicle. This exemplary embodiment or another exemplary embodiment may further provide deploying a swarm having a plurality of underwater platforms into the body of water, wherein each underwater platform in the swarm has a clock and at least one polarimetric sensor. This exemplary embodiment or another exemplary embodiment may further provide calculating the global position of each underwater platform in the swarm; and communicating the global position of each underwater platform in the swarm to each of the other underwater platforms in the swarm. This exemplary embodiment or another exemplary embodiment may further provide timing communications signals between each underwater platform in the swarm and each other underwater platform in the swarm; and calculating the position of each underwater platform in the swarm relative to each other underwater platform in the swarm via the calculated global position of each underwater platform in the swarm and the timing of the communications signals between each underwater platform in the swarm. This exemplary embodiment or another exemplary embodiment may further provide performing a course corrective action for at least one underwater platform in the swarm in response to calculating the global position of that particular underwater platform in the swarm. This exemplary embodiment or another exemplary embodiment may further provide determining the direction of the sun, calculating the global position of each of the underwater platforms in the swarm, and performing the course corrective action at accomplished without any of the underwater platforms in the swarm surfacing. This exemplary embodiment or another exemplary embodiment may further provide wherein each underwater platform is an autonomous underwater vehicle.

BRIEF DESCRIPTION OF THE SEVERAL VIEWS OF THE DRAWINGS

Sample embodiments of the present disclosure are set forth in the following description, are shown in the drawings and are particularly and distinctly pointed out and set forth in the appended claims.

DETAILED DESCRIPTION

With general reference to the figures, a polarimetric navigation system is generally shown as reference 8. This system 8 may employ one or more autonomous platforms 10 (such as an autonomous underwater vehicle (AUV) 10, described below).

Figure 1:
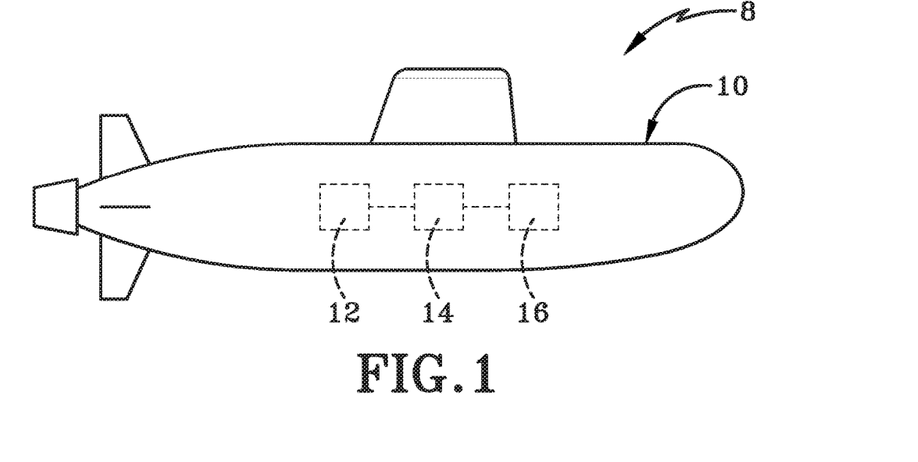
FIG. 1 (FIG. 1) is an exemplary autonomous underwater vehicle (AUV) depicted as a mini-submarine according to one aspect of the present disclosure.

With reference to FIG. 1, an underwater platform may be shown and generally indicated as reference 10. Platform 10 may be any suitable underwater vehicle including manned or unmanned vehicles, autonomous vehicles, or remotely controlled vehicles as dictated by the desired implementation. As shown and described further herein, platform 10 may be an autonomous underwater vehicle (AUV) 10 which may be shown and further described herein as a mini submarine (mini sub) or other similar AUV 10 capable of carrying the relevant components described below while operating according to the methods presented herein. However, it will be understood that the elements and methods described herein could be carried out by other appropriate platforms 10 capable of carrying the required components as discussed below. It will be further understood that multiple platforms 10 may be deployed in a swarm such as a swarm of AUVs 10 that may utilize similar and/or identical elements and components to perform the methods described herein. Thus it will be further understood that references to platform 10 or AUV 10 herein are contemplated to include any suitable platform 10 as dictated by the desired implementation and that AUV 10 is an exemplary model of a platform 10 and not a limiting example thereof. It will be further understood that the methods of operation and use described herein may be equally applied across multiple communicating and/or cooperating platforms 10 employed in or as a swarm or similar construct.

AUV 10 may generally include an onboard clock 12, one or more polarimetric sensors 14, and one or more processors 16. Although shown in FIG. 1 arranged linearly within AUV 10, clock 12 polarimetric sensor 14 and or processor 16 may be placed in any configuration as dictated by the desired implementation and may not be arranged linearly or in any particular order.

Clock 12 may be any suitable clock provided it is both precise and operable to calculate, store, and keep track of both the time and date as described further herein. According to one aspect, clock 12 may be an atomic clock which may be configured according to international atomic time, coordinated universal time, or any other suitable time scale that may be employed or desired as dictated by the desired implementation. According to another aspect, clock 12 may be a mechanical clock with a suitable level of precision as to be stable for at least a period of time longer than an anticipated mission timeframe as dictated by the desired implementation. According to one example, a mechanical clock may have an accuracy of less than 1 second per year or more.

Polarimetric sensor 14 may be one or more polarization selective sensors having an array 20 configured to detect the polarization of sunlight via the scattering thereof through the water column, as discussed further below. According to one aspect, the one or more polarimetric sensors 14 may be polarization selective cameras or other polarization cameras that may be commercially available or may be low light cameras fitted with one or more micropolarizer arrays and/or field of view optics for in-water imaging. According to one example, the one or more polarimetric sensors 14 may be Raptor Photonics Hawk 252 Electron Multiplying CCD (EMCCD) cameras commercially available from Raptor Photonics Limited or other similar commercially available polarization cameras.

Figure 2:
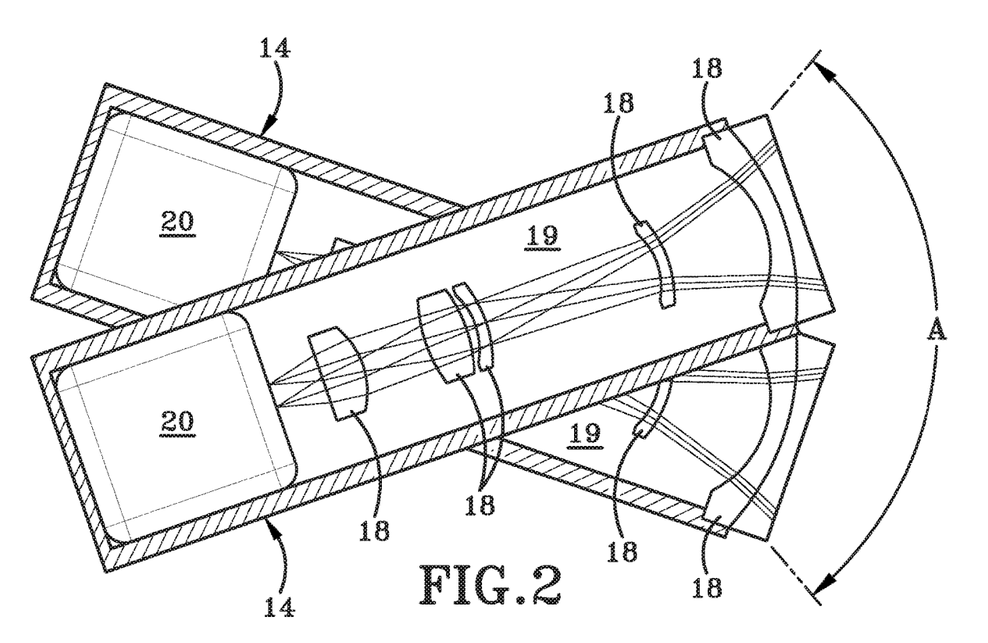
FIG. 2 (FIG. 2) is an overhead schematic view of a dual polarimetric sensor arrangement according to one aspect of the present disclosure.

With reference to FIG. 2, an exemplary version of polarimetric sensors 14 is shown having a two camera overlay having one or more lenses 18 included therein is shown having an approximate 100 degree field of view (indicated as Ange A in FIG. 2) created by two separate and overlapping 58 degree fields of view. According to another aspect, the field of view may be adjusted to any suitable angle as desired or dictated by the desired implementation. Polarized light (shown as the lines moving down optical path 19) may enter the sensors 14 and travel through lenses 18 down optical path 19 towards the sensor 14 array 20. While FIG. 2 is an exemplary implementation of multiple polarimetric cameras 14, it will be understood that any suitable number of cameras in any suitable configuration with a variety of resolutions, for example, 8-micron, 16-micron, or 32-micron, may be utilized according to the desired implementation and operational parameters thereof. Polarimetric cameras 14 may further include one or more filters (not shown) to filter out ambient noise or light interference as required by the desired implementation.

Lenses 18 used with polarimetric sensor(s) 14 may be any standard or custom optical lenses of any shape as dictated by the implementation parameters. For example, lenses 18 may be shaped as bi-convex, plano-convex, positive meniscus, negative meniscus, plano-concave, or bio-concave lenses. The specific order, orientation, arrangement, and/or type of optical lenses used for lenses 18 may also vary depending upon the particular implementation and installation parameters of polarimetric sensor(s) 14. Lenses 18 may be of any shape suitable for the desired implementation. According to one example, lenses 18 may be circular or semi-circular in shape. According to other examples, lenses 18 may be rectangular, square, elliptical, or any other shape as dictated by the installation parameter. Lenses 18 may each further have a thickness that may be dictated by the type of lenses 18 (e.g. bi-convex, plano-convex, positive meniscus, negative meniscus, plano-concave, or bio-concave), by the distance between lenses 18, and by the overall length of optical path 19. Lenses 18 may be fabricated or machined from materials having light permeable properties such as mirrored glass, optical grade glass, or any other suitable material. According to one aspect, different materials may be used for each individual lens 18 according to the desired effect on the polarized light as it passes through each lens 18. While the depth of the polarimetric sensor(s) 14 may affect the operation thereof, it will be generally understood that the larger the lenses 18 and/or the better the resolution of polarimetric sensors 14, the finer the ability to discriminate subtle polarization variations at any given light level, as further discussed below.

Array 20 may be a standard pixel array configured to detect or otherwise respond to polarized light entering sensors 14. Array 20 may be integrated into sensors 14 such that it is considered a part of sensor 14. Array may have any suitable number of pixels or any suitable size as dictated by the desired implementation.

Processor 16 may be one or more processors 16, one or more logics or series of logics and may include or otherwise be in communication with one or more non-transitory storage mediums. Processor 16 may be a digital processor capable of carrying out and executing a set of instructions or processes encoded thereon. According to one aspect, processor 16 may be operationally connected to other components within AUV 10 as discussed further below. According to another aspect, processor 16 may be remote from the other AUV components and may be in wired, wireless, or in any suitable combination of wired and wireless communication therewith. The connectivity and communication between other AUV 10 components and processor 16 may therefore vary depending upon the desired implementation and installation parameters of AUV 10 components as discussed herein.

Clock 12, polarimetric sensors 14, and/or or processor 16 may be in further communication with other systems on board AUV 10 such that relevant data may be communicated therebetween. For example, where AUV 10 is realized as a mini sub, other on-board navigational components, including inertial measurement units (IMUs) may relay data to clock 12, polarimetric sensor 14, and/or processor 16 relating to factors such as speed, depth, orientation, or the like. Similarly, communication components such as receivers, transmitters, transceivers, or the like may be in communication with one or more of clock 12, polarimetric sensor 14 and/or processor 16 as dictated by the desired implementation. Likewise, clock 12, polarimetric sensors 14, and/or processor 16 may communicate data to the AUV 10 including to any operator or operators thereof. Such communication between clock 12, polarimetric sensors 14, and/or processor 16 and other systems of AUV 10 may allow for automated or manual responses to the shared data such as steering towards or away from a specific location to best fit the needs of AUV 10.

It will be understood that the elements and components of AUV 10 as described herein may be adapted for use with other vehicles, including manned or unmanned vehicles for any suitable purpose and may therefore include, omit, or replace any of these components as necessary for the desired implementation. For example, where AUV 10 is a manned underwater platform 10 such as a manned submarine, clock 12 may be replaced by a remote clock operated or otherwise monitored by a person who may then input or otherwise implement date and/or time measurements to processor 16 for use with polarimetric data collected by polarimetric sensor 14, as discussed further herein.

Having thus described the elements and components of an exemplary AUV 10, the operation and methods of use for underwater navigation system 8 thereof will now be described.

Sunlight traveling through air is generally not polarized; however, as sunlight hits and/or moves through water, the light waves can scatter in multiple directions. These scattered waves, or scattered light, that continues on in the exact same direction, (e.g. downward) as discussed herein remains unpolarized while light that scatters off of the original direction is polarized to some degree. Specifically, light scattering less than 90 degrees off of the original directional vector is partially polarized, becoming closer to 100 percent polarized as you approach 90 degrees. In other words, light scattering at, or very near, 90 degrees to the sun's direction is nearly 100 percent polarized (as the light propagates further into the water, multiple forward scattering gradually bends some of the ray directions, so that the plane at 90 degrees to the initial propagation direction includes some light scattered at slightly more and slightly less than 90 degrees, thus a plane having a true 100 percent polarization value is unlikely). Accordingly, as described further below, if you have a polarimetric sensor, such as sensor 14, placed within the water, you can determine the direction to the sun from the sensor by knowing the polarization plane the sensor 14 is in as compared to the plane with maximum polarization. Using this information, the direction of the sun, coupled with a precise time and date provided by clock 12, may allow you to determine the position of the sensor 14 in any body of the water, anywhere in the world, as discussed further below.

The use of the sun as it travels through water and becomes polarized to navigate may allow vehicles such as AUV 10 to navigate without surfacing, utilizing polarimetric sensor 14 and a precise clock 12, as discussed below. This is similar to certain animals that are known or believed to utilize polarized light to navigate as they swim. Further, because the sun only has a 0.5 degree angled variability, i.e. the sun is only one-half of a degree wide as viewed from Earth, the methods described herein may allow for precise localization and navigation without the need to rely on surface-based sensors or similar information such as a global positioning system signal or satellite signal.

Figure 3:
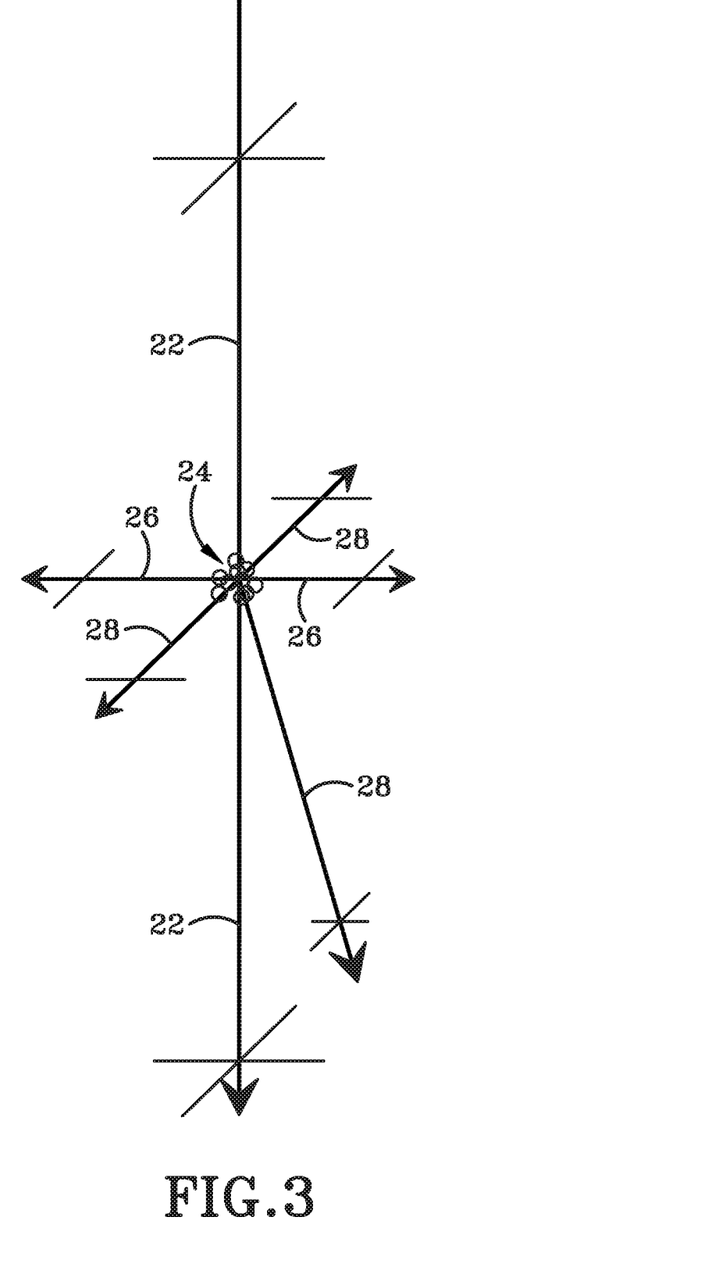
FIG. 3 (FIG. 3) is a schematic view of light scattering as it passes into and through a medium according to one aspect of the present disclosure.

With reference to FIG. 3, a diagrammatic view of unpolarized light traveling downwards and into a new medium, such as a body of water, is depicted, showing down welling, unpolarized light as arrow 22. As this down welling light enters the new medium, it encounters a group or a number of elements generally referred to as scatterers 24, which may cause the light to scatter as it passes therethrough. In this particular aspect, the scatterers 24 may be or include individual water molecules, as well as any particulate matter suspended or dissolved within the water itself. For example, where the medium is a body salinized water, such as sea water, the scatterers 24 may include the water molecules themselves, along with dissolved salts and the like contained therein.

As the light moves through these scatterers 24, the degree of polarization will ultimately depend on the concentration of large particles as light tends to scatter many times before exiting these large particles, as well as on the range to the polarimetric sensor 14. Light moving through scatterers 24 may generally scatter or travel in any direction including the same downward direction as the original light source, such as down welling light 22. Light travelling in the same direction represents a zero degree scatter and while light travelling along a perpendicular plane relative to the original vector represents light being scattered at 90 degrees. As seen then in FIG. 3, light scattering 90 degrees may be represented by the arrows indicated at reference 26 while light scattering at an incidence angle of less than 90 degrees to the original light direction 22 are indicated at arrows referenced 28.

The phenomenon of polarized scattering in sea water is well known and generally provides that light scattered at 90 degrees or very near thereto (as indicated by arrows 26) is close to 100 percent polarized (accounting for the inclusion of bent light rays, as discussed above) in that scattering plane while light scattered at less than 90 degrees (as indicated by arrows 28) is partially polarized and may range in polarization from close to zero (for light traveling in the same original direction 22) up to close to 100 percent (for light scattered perpendicularly, i.e. along vectors 26) depending on the degree of scatter relative to the original light direction indicated by arrow 22. This polarized scattering through water has been previously exploited to improve underwater photography, and methods for polarization processing have been developed therefor with the results of those processing methods indicating that utilizing polarimetry can double the range of passive polarimetric cameras or sensors such as polarimetric sensor 14.

As previously discussed herein, one or more polarimetric sensors 14 may therefore be utilized to look for the polarization planes of the sunlight as it scatters through the water column. According to one aspect, individual polarimetric sensors 14 may be calibrated and used to detect or "see" different polarization directions. Alternatively, a single polarimetric sensor 14 may be utilized having polarized pixels in its array 20 covering all polarization directions potentially recorded.

As shown and discussed with reference to FIG. 2, these one or more polarimetric sensors 14 may utilize an overlapping configuration to increase the field of view to capture as much scattered sunlight data as is necessary for the desired implantation of the present process. The advantage of using sunlight as opposed to an artificially produced light source, such as a laser beam or the like, is that once the direction to the sun is determined, it may be compared with data relating to the specific time of day and day of the year to provide an exact or nearly exact position anywhere in the world by longitude and latitude without the need to surface and verify the position of the polarimetric sensor 14. A further advantage is simply that an artificially produced light source, such as a laser beam or the like, would need to be produced and directed into the water column, thus defeating the ability of platforms 10 to operate covertly and safely. As used herein, covert refers to operating without surfacing and without using GPS and further without detectable transmission of signals or beacons.

Because the sunlight scatters in any and all direction as it moves through scatterers 24 in the water column, the sensor 14 will inevitably detect light having a less than ideal polarization. Thus, it is beneficial and most useful to discriminate the differences in polarization across a scene rather than measuring the absolute polarization of any one detected light source or angle. By doing so, namely measuring the polarization across the scene, the sensor 14 may communicate these polarization measurements to processor 16, which may then determine the direction of maximum polarization with an attempt to find the plane or direction wherein polarization is as close to 100 percent as possible to provide the plane that is perpendicular, or "normal", to the direction of the sun. Due to the tilt of the Earth's axis and the fact that the Earth is a sphere, this known plane with maximum (closest to 100 percent) polarization, coupled with the precise clock 12 providing a precise time and date, allows the position of the sensor 14 to be calculated accurately in any body of water around the world by comparing the detected direction of the sun relative to the time and date to a chart or database of the known position of the sun at that time and date.

Implementation of underwater polarimetric sensing for use in navigation may provide many advantages, one of which may be that it enables an underwater platform, such as an AUV 10 as discussed herein, to navigate for an extended period of time while remaining concealed within the water column and without surfacing to provide navigational fixes. According to one example, an AUV 10 utilizing a precise clock 12 and a polarimetric sensor 14 as discussed herein, may be deployed into a body of water with an initial heading and/or destination and may begin navigating towards that specific destination. At times where sunlight is not available, such as on an overcast or cloudy day, or at night, AUV 10 may use standard and common INS components, which may allow AUV 10 to move towards its target destination without using the sun. Once the sunlight is then available, i.e. during the day, between clouds, and/or once cloud cover has dissipated, the AUV 10 may utilize its clock 12 and polarimetric sensors 14 to determine its precise location, thus allowing it to adjust or fix any errors introduced via drifting or currents while AUV was operating utilizing INS components alone. This may then allow AUV 10 to get a fix on its location and may automatically course correct. Where AUV 10 is a manned platform, these data may be provided to an operator, navigator and/or pilot of the manned platform 10, who may then make manual course corrections as dictated by the desired implementation. In either scenario, manned or unmanned, AUV 10 and/or platform 10 may make course corrective adjustments based on its localized position relative to the sun without surfacing to connect to satellites or global positioning system (GPS) signals, which in turn allows AUV 10 to operate for longer periods of time while minimizing the chance of detection and protecting the safety of AUV 10 by minimizing or eliminating the need to surface during operation. Global position as used herein refers to a latitude and longitude.

As discussed herein, it is understood that these navigational techniques utilizing polarized sunlight are best employed in areas where sunlight is sufficient, thus limiting the application of such methods in areas where there is little to no sunlight, for example, within the arctic circle during the winter months. Other applications of these processes may allow for utilization of similar systems in other light provided scenarios as dictated by the desired implementation. For example, the process herein may be readily adapted for use with moonlight provided the AUV 10 and its various components to account for the position of the moon relative to the date and time provided by clock 12. This implementation assumes AUV 10 is operating at a shallow enough depth to provide sufficient moonlight penetration into the water column. Additionally, it will be understood that these methods may be utilized under some cover. For example, some light ice cover or the like, again provided sufficient light can penetrate the water column to the operational depth of AUV 10 as dictated by the desired implementation.

Further, the operational depth of AUV 10 will have an effect on the present process as it is well known that light scatters and less light is available for detection and operation as you move deeper into the water column. While no specific depth is required, it will be understood that AUVs 10 are contemplated to operate at sufficient depth to be concealed, which in many instances may only be a few meters. Additionally, as discussed previously herein, utilizing polarimetric sensors 14 with a better resolution and/or larger lenses 18 may increase the operational depth wherein the present processes may be utilized. Specifically, increasing the lens 18 size and/or the resolution of the sensors 14 may allow better ability to discriminate subtle polarization variations at depth. According to one aspect, the maximum viable depth for the present system 8 and process may be defined by the maximum scattering length of the specific sensors 14 and lenses 18 used, and may vary according to the desired implementation. Where multiple AUVs 10 are deployed in a swarm, as discussed herein, the exploitable depth may increase by providing a larger baseline to compute the polarization plane to determine the direction of the sun.

As discussed with reference to FIG. 3, the light source may be down welling in the sense that it may come from above the body of water in which AUV 10 is deployed; however, the angle of the down welling light 22 relative to the body of water may not be from directly overhead. For example, at sunrise, the sunlight may enter the body of water from a very low incidence angle; however, the light will still scatter as it enters the water column in all directions and the light scattering 90 degrees or very near 90 degrees from the direction in which the light enters the water column will still be polarized at or very near 100 percent. Thus, by way of this example, if the sunlight is entering the water column at an angle of less than 10 degrees, the light scattered 90 degrees therefrom may be traveling in a nearly downward direction; however, it will be understood that this may still provide the proper determination of the position of the sun relative to these polarimetric sensors 14.

This process may be enhanced by deploying or utilizing multiple communicating platforms 10 in a swarm or mini swarm, with each platform having its own clock 12, polarimetric sensor 14 and processor 16, along with relevant communications components; for example, a swarm of four or more AUVs 10 may be deployed into a body of water that may utilize communications timing to determine their positions relative to each other. A process for determining the relative position for members of a swarm via communications timing is taught by commonly owned U.S. patent Ser. No. 16/835,887, filed on Mar. 31, 2020, the disclosure of which is incorporated herein by reference.

If each of these AUVs 10 contained within a swarm further utilizes the process discussed herein to determine its global position relative to the sun, these AUVs 10 may further communicate their position globally and relative to each other to other members of the swarm to further enhance the localization of each member of the swarm. This application may provide further distinct advantages over a single unit operating in that if one or more units are in a position where sunlight is obscured, such as under a cloud or behind an obstacle, the positioning abilities of the other members of the swarm may allow them to maintain and/or course correct to maintain an accurate position and course heading. As with a single unit, this may prevent or eliminate the need to surface to course correct and/or provide navigational fixes while allowing AUVs 10 to remain concealed and/or undetected. Once the plane of maximum polarization is known, the headings of the vehicles relative to that plane are straightforward to compute from polarimetry (except for the case of having the sun very near zenith). This gives heading relative to global coordinates; however, the polarization-based heading may be redundant if the AUVs 10 carry magnetic compasses. For example, once the global position of an AUV 10 or the swarm of AUVs 10 is known, its heading can be determined by comparing the compass direction to a geomagnetic lookup table.

It will be understood that polarimetric data may be collected at any point as dictated by the desired implementation. For example, where feasible and/or operationally necessary, polarimetric data may be collected on an as needed basis at a regular interval or on a predetermined schedule as desired and/or dictated by the desired implementation. It will be understood that AUV 10 may course correct as necessary with a level of precision dictated by the desire implementation as well. For example, where AUV 10 is traveling to a generalized destination such as a coast of a certain continent or country but an exact position along that coast is not required, course corrections may be performed less often and/or with less precision as desired. Alternatively, where AUV 10 is navigating to a more exact destination, such as to a port or to a specific location, course corrections via the process described herein may be performed more often, including on a semi-continuous or continuous basis as necessary.

Figure 4:
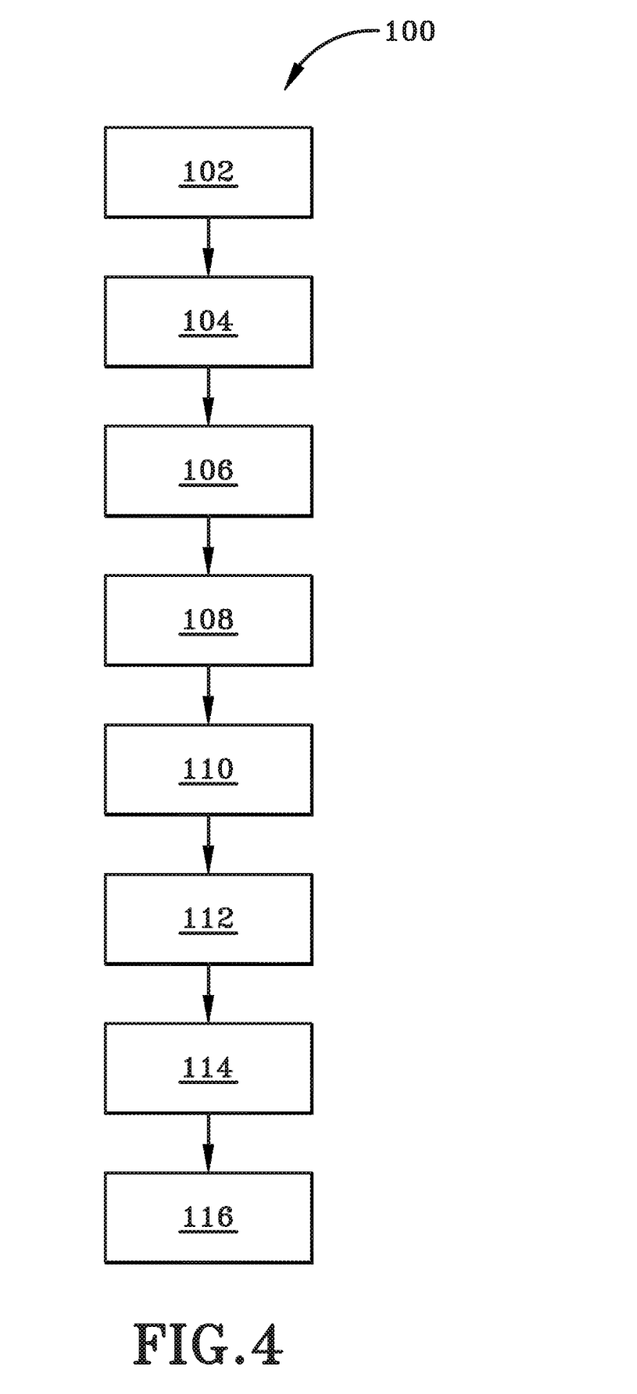
FIG. 4 (FIG. 4) is an exemplary flow chart illustrating a method of operation and use for a polarimetric navigational system swarm according to one aspect of the present disclosure Similar numbers refer to similar parts throughout the drawings.

With reference to FIG. 4, an exemplary flow chart outlining an exemplary method of operation utilizing the process herein is shown and generally indicated as process 100. While shown in a linear fashion with each step of process 100 occurring after the previous step, it will be understood that this process may be adjusted or performed in any suitable order and/or with steps performed concurrently or simultaneously with other such steps, unless specifically stated otherwise.

Accordingly, one or more platforms 10, such as AUVs 10, may be deployed into a body of water with each AUV 10 having a precise clock 12, one or more polarimetric sensors 14, and one or more processors 16 as discussed previously herein. The deployment of an AUV 10 into a body of water is indicated as step 102 in process 100. Once deployed, the AUV may begin navigation towards its desired destination which shown as step 104 in process 100. The desired destination can be any course, objective or location of the AUV. In one example the desired destination is tracking another maritime asset. A further example of a desired destination is a location that can be established prior to launch of the UAV or updated by communications with an approved source.

While navigating towards its desired destination, AUV 10 may employ inertial navigational systems (INS) and related INS components (such as IMUs) to maintain its general heading towards its destination. Simultaneously or subsequently to navigation via the INS components, AUV 10 may collect polarimetric data by exposing the polarimetric sensors 14 to sunlight as it moves through the water column and may communicate this data to processor 16 for further processing. The collection of polarimetric data is indicated as step 106 while the communication thereof to the processor is indicated as step 108 in process 100.

Once again, prior to, simultaneously, or subsequently to the collection of polarimetric data and the communication thereof to processor 16, AUV 10 may communicate both a precise time and date to the processor 16 via clock 12 to allow calculation of the global position of AUV 10. The communication of time and date from the clock 12 to the processor 16 is indicated at step 110 in process 100.

Once supplied with the polarimetric data from sensor 14 and the time and date from clock 12, processor 16 may utilize this information to calculate the global position of AUV 10 by comparing the collected data to a known database of the position of the sun at that particular time on that particular date. This may allow AUV 10 to calculate its longitude and latitude anywhere in the world. The calculation of the position of AUV 10 or more particularly, the position of the polarimetric sensor 14 of AUV 10, is generally indicated as step 112 in process 100.

As AUV 10 continues navigation towards its desired destination, the position calculated in step 112 may be utilized to initiate or perform one or more course corrections. The performance of a course correction is shown as step 114 and may generally include actions such as adjusting the heading, speed, depth, or the like of AUV 10. According to one aspect, these corrections may be performed at any interval ranging from an as needed basis up to a continuous basis to maintain the desired level of accuracy in the navigation of AUV 10 to its destination.

Where AUV 10 is deployed as part of a swarm, once the position of any particular AUV 10 within the swarm is calculated in step 112, that position may be communicated to the other members of the swarm to allow the other members to maintain a relative position thereto as dictated by the desired implementation. The communication of position between members of the swarm is indicated as step 116. It is understood that step 116 may not be necessary in all situations, particularly where a single unit is operating such that the communication of its position may be wholly unnecessary.

Various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

The above-described embodiments can be implemented in any of numerous ways. For example, embodiments of technology disclosed herein may be implemented using hardware, software, or a combination thereof. When implemented in software, the software code or instructions can be executed on any suitable processor or collection of processors, whether provided in a single computer or distributed among multiple computers. Furthermore, the instructions or software code can be stored in at least one non-transitory computer readable storage medium.

Also, a computer or smartphone utilized to execute the software code or instructions via its processors may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers or smartphones may be interconnected by one or more networks in any suitable form, including a local area network or a wide area network, such as an enterprise network, and intelligent network (IN) or the Internet. Such networks may be based on any suitable technology and may operate according to any suitable protocol and may include wireless networks, wired networks or fiber optic networks.

The various methods or processes outlined herein may be coded as software/instructions that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, various inventive concepts may be embodied as a computer readable storage medium (or multiple computer readable storage media) (e.g., a computer memory, one or more floppy discs, compact discs, optical discs, magnetic tapes, flash memories, USB flash drives, SD cards, circuit configurations in Field Programmable Gate Arrays or other semiconductor devices, or other non-transitory medium or tangible computer storage medium) encoded with one or more programs that, when executed on one or more computers or other processors, perform methods that implement the various embodiments of the disclosure discussed above. The computer readable medium or media can be transportable, such that the program or programs stored thereon can be loaded onto one or more different computers or other processors to implement various aspects of the present disclosure as discussed above.

The terms "program" or "software" or "instructions" are used herein in a generic sense to refer to any type of computer code or set of computer-executable instructions that can be employed to program a computer or other processor to implement various aspects of embodiments as discussed above. Additionally, it should be appreciated that according to one aspect, one or more computer programs that when executed perform methods of the present disclosure need not reside on a single computer or processor, but may be distributed in a modular fashion amongst a number of different computers or processors to implement various aspects of the present disclosure.

Computer-executable instructions may be in many forms, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that convey relationship between the fields. However, any suitable mechanism may be used to establish a relationship between information in fields of a data structure, including through the use of pointers, tags or other mechanisms that establish relationship between data elements.

All definitions, as defined and used herein, should be understood to control over dictionary definitions, definitions in documents incorporated by reference, and/or ordinary meanings of the defined terms.

"Logic", as used herein, includes but is not limited to hardware, firmware, software and/or combinations of each to perform a function(s) or an action(s), and/or to cause a function or action from another logic, method, and/or system. For example, based on a desired application or needs, logic may include a software controlled microprocessor, discrete logic like a processor (e.g., microprocessor), an application specific integrated circuit (ASIC), a programmed logic device, a memory device containing instructions, an electric device having a memory, or the like. Logic may include one or more gates, combinations of gates, or other circuit components. Logic may also be fully embodied as software. Where multiple logics are described, it may be possible to incorporate the multiple logics into one physical logic. Similarly, where a single logic is described, it may be possible to distribute that single logic between multiple physical logics.

Furthermore, the logic(s) presented herein for accomplishing various methods of this system may be directed towards improvements inexisting computer-centric or internet-centric technology that may not have previous analog versions. The logic(s) may provide specific functionality directly related to structure that addresses and resolves some problems identified herein. The logic(s) may also provide significantly more advantages to solve these problems by providing an exemplary inventive concept as specific logic structure and concordant functionality of the method and system. Furthermore, the logic(s) may also provide specific computer implemented rules that improve on existing technological processes. The logic(s) provided herein extends beyond merely gathering data, analyzing the information, and displaying the results. Further, portions or all of the present disclosure may rely on underlying equations that are derived from the specific arrangement of the equipment or components as recited herein. Thus, portions of the present disclosure as it relates to the specific arrangement of the components are not directed to abstract ideas. Furthermore, the present disclosure and the appended claims present teachings that involve more than performance of well-understood, routine, and conventional activities previously known to the industry. In some of the method or process of the present disclosure, which may incorporate some aspects of natural phenomenon, the process or method steps are additional features that are new and useful.

The articles "a" and "an," as used herein in the specification and in the claims, unless clearly indicated to the contrary, should be understood to mean "at least one." The phrase "and/or," as used herein in the specification and in the claims (if at all), should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc. As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

When a feature or element is herein referred to as being "on" another feature or element, it can be directly on the other feature or element or intervening features and/or elements may also be present. In contrast, when a feature or element is referred to as being "directly on" another feature or element, there are no intervening features or elements present. It will also be understood that, when a feature or element is referred to as being "connected", "attached" or "coupled" to another feature or element, it can be directly connected, attached or coupled to the other feature or element or intervening features or elements may be present. In contrast, when a feature or element is referred to as being "directly connected", "directly attached" or "directly coupled" to another feature or element, there are no intervening features or elements present. Although described or shown with respect to one embodiment, the features and elements so described or shown can apply to other embodiments. It will also be appreciated by those of skill in the art that references to a structure or feature that is disposed "adjacent" another feature may have portions that overlap or underlie the adjacent feature.

Spatially relative terms, such as "under", "below", "lower", "over", "upper", "above", "behind", "in front of", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if a device in the figures is inverted, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly. Similarly, the terms "upwardly", "downwardly", "vertical", "horizontal", "lateral", "transverse", "longitudinal", and the like are used herein for the purpose of explanation only unless specifically indicated otherwise.

Although the terms "first" and "second" may be used herein to describe various features/elements, these features/elements should not be limited by these terms, unless the context indicates otherwise. These terms may be used to distinguish one feature/element from another feature/element. Thus, a first feature/element discussed herein could be termed a second feature/element, and similarly, a second feature/element discussed herein could be termed a first feature/element without departing from the teachings of the present invention.

An embodiment is an implementation or example of the present disclosure. Reference in the specification to "an embodiment," "one embodiment," "some embodiments," "one particular embodiment," "an exemplary embodiment," or "other embodiments," or the like, means that a particular feature, structure, or characteristic described in connection with the embodiments is included in at least some embodiments, but not necessarily all embodiments, of the invention. The various appearances "an embodiment," "one embodiment," "some embodiments," "one particular embodiment," "an exemplary embodiment," or "other embodiments," or the like, are not necessarily all referring to the same embodiments.

If this specification states a component, feature, structure, or characteristic "may", "might", or "could" be included, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

As used herein in the specification and claims, including as used in the examples and unless otherwise expressly specified, all numbers may be read as if prefaced by the word "about" or "approximately," even if the term does not expressly appear. The phrase "about" or "approximately" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), etc. Any numerical range recited herein is intended to include all sub-ranges subsumed therein.

Additionally, the method of performing the present disclosure may occur in a sequence different than those described herein. Accordingly, no sequence of the method should be read as a limitation unless explicitly stated. It is recognizable that performing some of the steps of the method in a different order could achieve a similar result.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of various embodiments of the disclosure are examples and the disclosure is not limited to the exact details shown or described.

The invention claimed is:

1. A system for covert underwater navigation comprising:
   at least one underwater platform operable to navigate to a desired destination;
   a clock carried by the underwater platform operable to maintain a precise time and date;
   at least one polarimetric sensor carried by the underwater platform operable to detect polarized light; and
   at least one processor carried by the at least one underwater platform and in operative communication with the clock and the at least one polarimetric sensor, the processor operable to determine a direction to the sun relative to the underwater platform and further operable to calculate a global position of the underwater platform via the time, the date, and the direction to the sun.

2. The system of claim 1 wherein the at least one underwater platform is further operable to make a course corrective action based on the global position calculated by the processor.

3. The system of claim 2 wherein the course corrective action is one of adjusting a heading, speed, and depth of the at least one underwater platform.

4. The system of claim 3 wherein the processor is further operable to determine the direction of the sun and calculate the global position of the at least one underwater platform, and the at least one underwater platform is further operable to perform the course corrective action, without the at least one underwater platform surfacing.

5. The system of claim 1 wherein the at least one underwater platform is an autonomous underwater vehicle.

6. The system of claim 1 further comprising:
   a plurality of underwater platforms operable to navigate to the desired destination, each underwater platform carrying a clock, at least one polarimetric sensor, and at least one processor.

7. The system of claim 6 wherein the plurality of underwater platforms are further operable to determine their position relative to each of the other underwater platforms via the timing of communications signals between each of the plurality of underwater platforms.

8. A method of underwater navigation comprising:
   deploying at least one underwater platform having a clock and at least one polarimetric sensor into a body of water;
   navigating towards a desired destination;
   detecting polarized light via the at least one polarimetric sensor;
   determining a direction to the sun relative to the underwater platform; and
   calculating the global position of the underwater platform based on the date, the time, and the direction to the sun.

9. The method of claim 8 wherein determining the direction to the sun relative to the underwater platform further comprises:
   determining a degree of polarization of the detected polarized light; and
   comparing the degree of polarization of the detected polarized light across a field of view of the at least one polarimetric sensor to determine a polarization plane closest to 100 percent polarization as a plane perpendicular relative to the direction of the sun.

10. The method of claim 8 further comprising:
    continuously detecting polarized light via the polarimetric sensor;
    continuously determining the direction to the sun relative to the underwater platform; and
    continuously calculating the global position of the underwater platform.

11. The method of claim 8 further comprising:
    performing a course corrective action in response to calculating the global position of the underwater platform.

12. The method of claim 11 wherein the course corrective action is one of changing a heading, a speed, and a depth of the underwater platform.

13. The method of claim 12 wherein determining the direction to the sun, calculating the global position of the underwater platform, and performing the course corrective action are accomplished without the underwater platform surfacing.

14. The method of claim 8 wherein the underwater platform is an autonomous underwater vehicle.

15. The method of claim 8 further comprising:
    deploying a swarm having a plurality of underwater platforms into the body of water, wherein each underwater platform in the swarm has a clock and at least one polarimetric sensor.

16. The method of claim 15 further comprising:
    calculating the global position of each underwater platform in the swarm; and
    communicating the global position of each underwater platform in the swarm to each of the other underwater platforms in the swarm.

17. The method of claim 16 further comprising:
    timing communications signals between each underwater platform in the swarm and each other underwater platform in the swarm; and
    calculating the position of each underwater platform in the swarm relative to each other underwater platform in the swarm via the calculated global position of each underwater platform in the swarm and the timing of the communications signals between each underwater platform in the swarm.

18. The method of claim 17 further comprising:
    performing a course corrective action for at least one underwater platform in the swarm in response to calculating the global position of that particular underwater platform in the swarm.

19. The method of claim 18 wherein determining the direction to the sun, calculating the global position of each of the underwater platforms in the swarm, and performing the course corrective action is accomplished without any of the underwater platforms in the swarm surfacing.

20. The method of claim 8, wherein calculating the global position further comprises comparing the direction to the sun to a chart or database having a known position of the sun at that time and date.

* * * * *